United States Patent Office 3,311,648
Patented Mar. 28, 1967

---

3,311,648
ORGANOTIN SULFONIUM COMPOUNDS
Sheldon Herbstman, Bronx, and Walter A. Stamm, Tarrytown, N.Y., assignors to Stauffer Chemical Company, New York, N.Y., a corporation of Delaware
No Drawing. Filed Oct. 21, 1963, Ser. No. 317,822
5 Claims. (Cl. 260—429.7)

This invention relates to organotin compounds and in particular to organotin sulfonium salts. The invention also pertains to the preparation of the aforesaid compounds.

In accordance with the present invention, it has been discovered that organotin halides and triarylsulfonium halides can be caused to react with one another thereby engendering a hitherto unknown class of organotin compounds and the provision of these new chemical entities constitutes the principal object and purpose of the invention. It is also an important object of the invention to provide methods of preparing the aforesaid organotin compounds. Other objects and purposes will become manifest subsequently.

The new and novel organotin compounds as contemplated herein appear to be complex tin salts, the chemical configuration of which can be conveniently visualized by reference to the following structural formulae:

(I) $\left[Ar_3S\right]_2^{+2}\left[RSnX_5\right]^{-2}$ 
(II) $[Ar_3S]^+[(R)_nSn(X)_{5-n}]^-$ wherein Ar represents an aromatic hydrocarbon radical of from 6 to 12 carbon atoms as exemplified by phenyl, p-chlorophenyl, p-tolyl, m-tolyl, p-ethoxyphenyl, m-methoxyphenyl, p-isopropoxyphenyl, p-biphenylyl, m-biphenylyl, 1-naphthyl, 4-methyl-1-naphthyl, 4-methoxy-2-naphthyl, etc., R represents an alkyl radical having from 1 to 18 carbon atoms, e.g. methyl, ethyl, n-propyl, isobutyl, n-butyl, n-pentyl, isohexyl, n-hexyl, n-heptyl, n-nonyl, n-decyl, n-dodecyl, 3-dodecyl, n-tridecyl, n-tetradecyl, n-pentadecyl, n-hexadecyl, n-heptadecyl, n-octadecyl, and the like, or an aromatic hydrocarbon radical as above defined for Ar, X designates a halogen as typified by chlorine or bromine, and $n$ is an integer of from 2 to 3, it being understood that when $n$ has the value 3, R is always an aromatic hydrocarbon radical as aforesaid. Organotin compounds falling within the ambit of the general formulae as above set forth include the following list of structures:

(1) 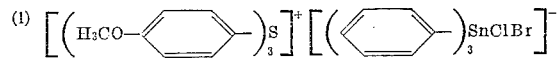

(2) 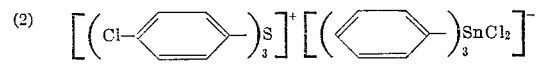

(3) 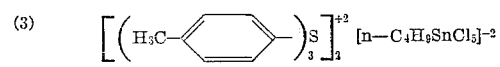

(4) 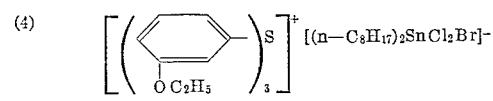

(5) 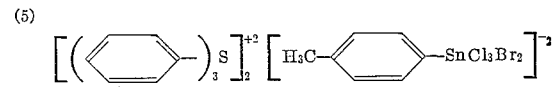

(6) 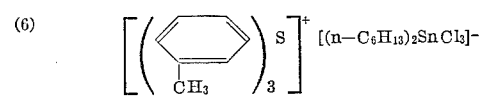

As previously pointed out, the organotin salts of the invention are formed from a triarylsulfonium halide and an organotin halide. An inspection of the chemical equations delineated below indicates that the reactants enter into direct combination to produce the organotin sulfonium salts, there being no concomitant by-products as characterizes metathetical reactions. The above referred to equations are as follows:

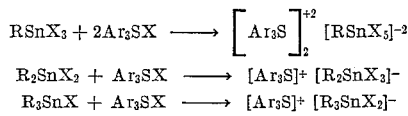

$R_2SnX_2 + Ar_3SX \longrightarrow [Ar_3S]^+[R_2SnX_3]^-$
$R_3SnX + Ar_3SX \longrightarrow [Ar_3S]^+[R_3SnX_2]^-$ wherein R, Ar and X have the significance as previously set forth.

In preparing the organotin sulfonium compounds of the invention, it has been ascertained that generally excellent results ensue by heating the triarylsulfonium halide and organotin halide in the presence of a normally liquid organic solvent, preferably one having a relatively high degree of polarity. Solvents which are particularly suitable include the lower saturated aliphatic ketones, alcohols, glycols and the various partially etherified glycol derivatives, and in this connection, reference is made to acetone, methyl ethyl ketone, methanol, Cellosolve, carbitol, ethanol, n-propanol and the like. It has been our experience that the reaction is conveniently performed by refluxing the components in the presence of the organic solvent, after which the organotin complex is isolated by crystallization.

The organotin salt complexes are crystalline, stable chemical entities which are characterized by unusually sharp melting points without decomposition. They are readily purified by recrystallization from the common organic solvents, preferably those of the polar variety. Because of their salt-like properties, the complexes tend to be insoluble in non-polar solvents such as hydrocarbons and ethers.

Although we have not as yet determined the nature of the chemical forces responsible for the formation of the hereindescribed organotin salt complexes, it is believed that secondary or residual valences of the tin atom provide the requisite bonding energy. Lending support to the aforesaid postulation is the well known tendency of certain chemical elements, including tin, to expand their valence shells beyond the usual complement of electrons, a characteristic commonly attributed to a residual affinity of the element, which in some instances is sufficient to give rise to coordination or complex compounds even after the element's normal valences have been satisfied.

In order to describe the compounds and process of making them in greater detail, reference is now made to the following examples which are submitted for the purpose of illustration only and are not to be construed as placing or imposing any limitations on the invention. It is furthermore to be understood that without departing from the spirit or scope of the invention, variations of practicing the same will occur to those skilled in the art.

EXAMPLE 1

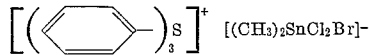

In 100 ml. of acetone was dissolved 43.8 g. (0.2 mole) of dimethyltin dichloride. To this was added 68.6 g. (0.2 mole) of triphenylsulfonium bromide in 100 ml. acetone. The slurry was heated 10–15 minutes at about 50° C. whereupon a clear solution resulted. The acetone was removed by distillation. The residual salt was brought to crystallization by trituration with warm pentane. Obtained was 112 g. (99.6%) of triphenylsulfonium dichloro-dimethyltin-bromide, M.P. 102° C.

*Analysis.*—Calcd. 20.9% tin; found 20.9% tin.

EXAMPLE 2

The above depicted organotin sulfonium salt was prepared in accordance with the procedure of Example 1, but using triphenyltin chloride. The results and yield generally were in consonance with those of the previous example. The melting point of the purified product is 165° C.

EXAMPLE 3

The organotin sulfonium salt of this example was obtained by reacting two moles of triphenylsulfonium bromide with one mole of phenyltin trichloride. The purified salt melted at 255° C.

The organotin compounds as contemplated by the present invention are useful for a variety of applications and purposes. It has, for instance, been ascertained that the compounds are useful as polymerization catalysts and in this connection they have been found effective in promoting the formation of polyurethanes from polyisocyanates and polyglycols. Another type of polymerization process which is facilitated by the organotin sulfonium halides is the production of polyesters from glycols and poly-functional carboxylic acids.

We claim:

1. An organotin compound selected from the class consisting of

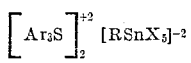

and

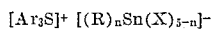

wherein Ar represents an aromatic hydrocarbon radical of from 6 to 12 carbon atoms, R is selected from the class consisting of alkyl having from 1 to 18 carbon atoms and an aromatic hydrocarbon radical of from 6 to 12 carbon atoms, X is a halogen selected from the class consisting of bromine and chlorine and $n$ is an integer of from 2 to 3, it being provided that when $n$ is 3, R is always an aromatic hydrocarbon radical as aforesaid.

2. An organotin compound of the formula

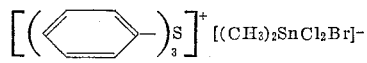

3. An organotin compound of the formula

4. An organotin compound of the formula

5. A method of preparing an organotin compound selected from the class consisting of

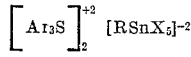

and

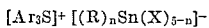

wherein Ar represents an aromatic hydrocarbon radical of from 6 to 12 carbon atoms, R is selected from the class consisting of alkyl having from 1 to 18 carbon atoms and an aromatic hydrocarbon radical of from 6 to 12 carbon atoms, X is a halogen selected from the class consisting of bromine and chlorine and $n$ is an integer of from 2 to 3, it being provided that when $n$ is 3, R is always an aromatic hydrocarbon radical as aforesaid, which comprises reacting a triarylsulfonium halide of the formula $Ar_3SX$ with an organotin halide selected from the class consisting of $RSnX_3$, $R_2SnX_2$ and $R_3SnX$, wherein Ar, R and X have the significance as above set forth, and isolating the so-obtained organotin compound.

No references cited.

TOBIAS E. LEVOW, *Primary Examiner.*

W. F. W. BELLAMY, *Assistant Examiner.*